No. 819,602. PATENTED MAY 1, 1906.
H. RUPP.
SPRAYER.
APPLICATION FILED AUG. 29, 1905.
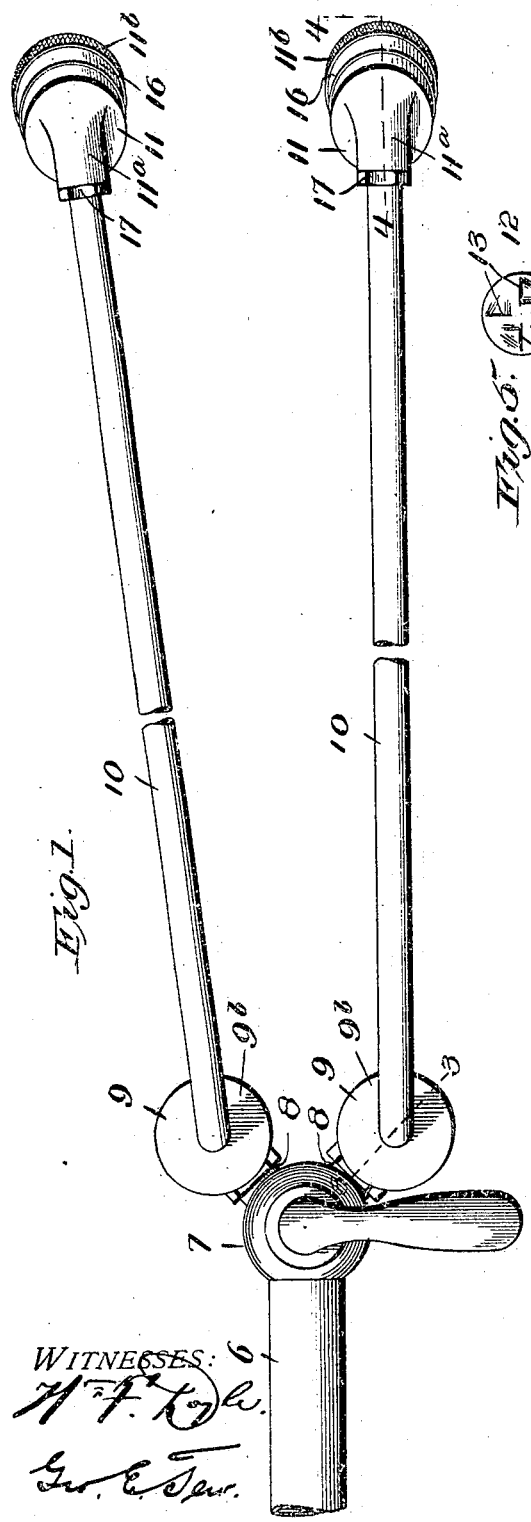
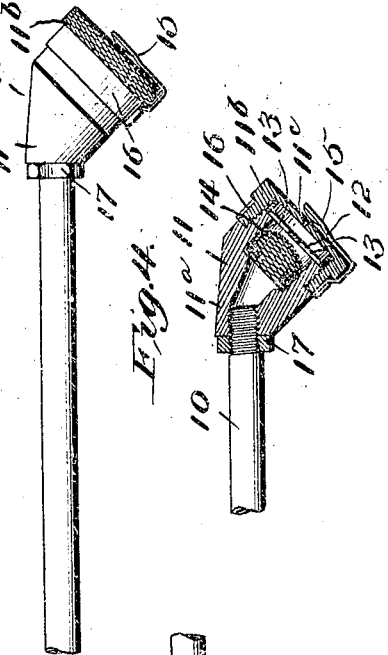
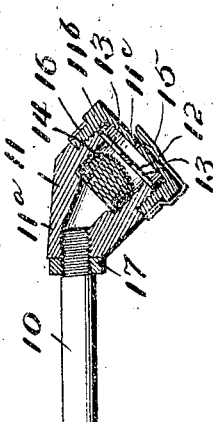
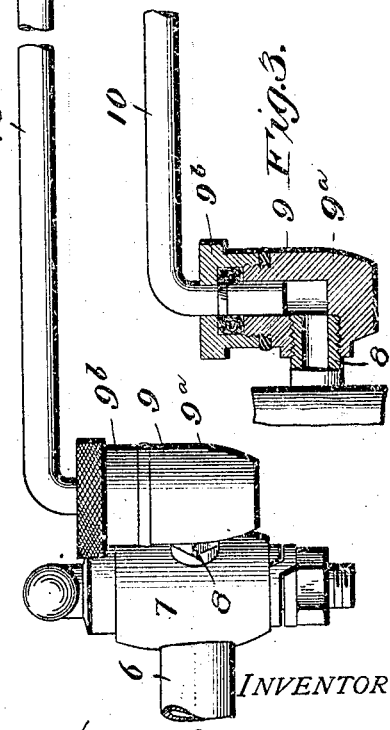
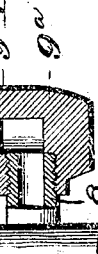
WITNESSES:
INVENTOR
Henry Rupp,
By Milo B. Stevens & Co.
Attorneys.

UNITED STATES PATENT OFFICE

HENRY RUPP, OF KRAFT, MICHIGAN.

SPRAYER.

No. 819,602.  Specification of Letters Patent.  Patented May 1, 1906.

Application filed August 29, 1905. Serial No. 276,243.

*To all whom it may concern:*

Be it known that I, HENRY RUPP, a citizen of the United States, residing at Kraft, in the county of Wayne and State of Michigan, have invented new and useful Improvements in Sprayers, of which the following is a specification.

This invention is a sprayer, particularly adapted for spraying plants, either with water, liquid insect-destroyers, or other liquids.

The object of the invention is to produce an improved device with which several plants may be sprayed at once and which can be manipulated to spray in various directions, such as under or around the plants.

In the accompanying drawings, Figure 1 is a plan view of the device. Fig. 2 is a side elevation. Fig. 3 is a section on the line 3 3 of Fig. 1. Fig. 4 is a section on the line 4 4 of Fig. 1. Fig. 5 is a plan view of a distributing disk or piece in the sprayer-heads.

Referring specifically to the drawings, 6 indicates a pipe which may be coupled to the hose through which the fluid is supplied. At the end of this pipe is a three-way cock 7, which controls the flow to branch pipes 8.

9 indicates couplings which connect the branches 8 to swinging tubes 10, which terminate in the sprinkler-heads 11. The couplings 9 are formed in two parts—a lower part or body $9^a$ and an upper part or cap $9^b$, screwed thereon. The part $9^a$ has a screw-threaded connection with the branch 8; but it is not locked and it may be turned by special effort to any angle with respect to said branch. The inner end of the swinging pipe 10 is bent down to extend through the top of the cap $9^b$, at the center thereof, and forms a swiveling joint, so that the arm 10 may be swung laterally on the coupling 9 as a center. A suitable packing is interposed between the movable parts to prevent leak. The sprinkler-heads 11 at the outer ends of the tubular arms or pipes 10 will also turn. The base-pieces $11^a$ of the heads have a screw-threaded connection with the end of the pipes, so that they may be turned to various angles when not locked by the nuts 17 to direct the heads in different directions accordingly. Caps $11^b$ are screwed on said base-pieces, and each cap has a jet-hole $11^c$ at the center. To vary the quantity and force of the liquid delivered through the jet, each head has within the same, between the body and the cap, a disk 12, provided with slits 13, through which the liquid flows. The number and shape of these slits control the volume and nature of the spray delivered, and the disks may be varied according to the nature of the spray desired. Each head has a coarse screen 14 in the base thereof to prevent dirt and small objects from clogging the jet-hole. To spray the jet delivered through the hole, each head is provided with a spoon-shaped finger 15, the bowl or concave part of which is located directly over the jet-hole, and the jet, impinging against the convex back of the bowl, is turned into a spray. The finger referred to is held in place by a band 16, extending around the cap of the sprayer-head. Nuts 17 are provided, which may be tightened at the joints if and when it be desired to hold the parts in set position.

The device is conveniently used by taking hold of the tubular arms 10, one in each hand, and carrying the same between rows of plants with each head discharging on one row, and the swiveling and turning joints provided enable the device to be manipulated so that the spray may be applied to the upper and under surfaces of the leaves and otherwise in various directions as may be desired. The three-way cock is of a well-known kind, permitting liquid to flow to either or both of the branches. Because of the three swiveling and turning joints between the cock and the sprinkler-heads the capacity for varying the direction of the spray is great and enables a spray to be put exactly where it is needed. The band 16 may be turned on the cap of the sprayer-head to extend the finger 15 in any direction, and consequently to direct the jet or spray in any desired direction.

What I claim as new, and desire to secure by Letters Patent, is—

1. A sprayer comprising a pipe terminating in a three-way-valve casing provided with branches, a pair of swinging extension branch pipes which terminate in spraying-heads and which may be turned toward or from each other, and couplings connecting said branches and the extension-pipes, each coupling having turning joints, on different axes, with the branches and the extensions respectively.

2. A sprayer comprising a supply-pipe terminating in a three-way-valve casing provided with a pair of branch pipes, a pair of swinging extension-pipes terminating in spraying-heads, and couplings connecting said branch pipes and the extension-pipes, each coupling consisting of a body having a turning connection with a branch pipe, and a turning connection with an extension-pipe, the axes of said connections being at an angle to each other.

In testimony whereof I have signed my name to this specification in the presence of two subscribing witnesses.

HENRY RUPP.

Witnesses:
ELIZABETH J. PRICE,
JESSIE A. GORDON.